Feb. 20, 1951   B. FOX   2,542,021
ELECTRONIC DISPLAY SYSTEM
Filed July 16, 1946

INVENTOR.
Benjamin Fox

Feb. 20, 1951    B. FOX    2,542,021
ELECTRONIC DISPLAY SYSTEM

Filed July 16, 1946    5 Sheets-Sheet 4

INVENTOR.
Benjamin Fox

Patented Feb. 20, 1951

2,542,021

UNITED STATES PATENT OFFICE 2,542,021

ELECTRONIC DISPLAY SYSTEM

Benjamin Fox, New York, N. Y.

Application July 16, 1946, Serial No. 683,965

15 Claims. (Cl. 177—346)

(Granted under the act of March 3, 1883, as amended April 30, 1928; 370 O. G. 757)

The invention described herein may be manufactured and used by or for the Government for governmental purposes, without the payment to me of any royalty thereon.

My invention relates generally to artistic and/or novelty display devices or the like. More particularly, the invention relates to such devices wherein luminous displays change or wink periodically to attract attention.

It is a principal object of my invention to provide a novel luminous display device.

Another object of my invention is to provide a novel luminous display device which periodically changes its pattern or winks at a visibly perceptible rate.

Another object of my invention is to provide a luminous display device employing cathode ray tubes, particularly tubes of the "magic eye" type, as luminous elements, wherein the fluorescent pattern of such tube is caused to change or wink periodically at a visibly perceptible rate.

Another object of my invention is to provide a novel clock employing displays of the aforementioned type, and particularly a display which changes in synchronism with the movement of the clock hands so that said display also performs a time-indicating function.

Heretofore, tubes of the cathode ray type have been used primarily as voltage or signal indicators. In accordance with my invention, these tubes are used to provide novel and artistic displays which may be used in a variety of forms and and for a variety of purposes, such as window displays, clocks, etc. Both steady and periodic "winking" light effects and displays can be produced in numerous patterns without the use of mechanical switching, or a minimum thereof.

For a better understanding of the invention, together with other and further objects thereof, reference is had to the following description taken in connection with the accompanying drawings, wherein like parts are indicated by like reference characters and wherein.

Figure 1:
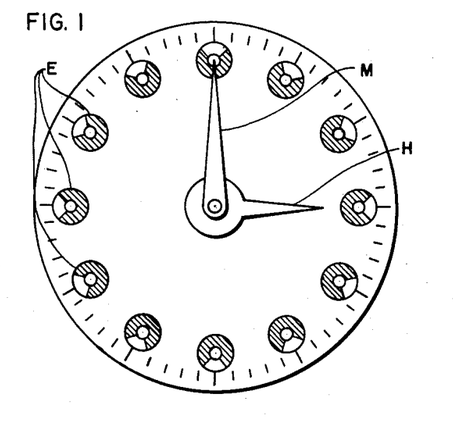
Figure 1 is an elevational view of the front face of a clock incorporating my invention.

Reference is now made particularly to Figure 1, which shows the front face of a novel and artistic clock display, having the usual hour hand H and minute hand M. In accordance with my invention, electronic means is used to indicate time. In particular, there are used as time-indicating indicia, either in place of the usual hour numerals, or as a supplement thereto, a plurality of electron tubes E having a fluorescent display, which may be either steady or continuously changing in position and/or area at a rate which is perceptible to the eye, i. e., at a rate which is slower than the persistence of vision rate. Although the invention is not restricted thereto, the particular type of tube illustrated herein is generally known as the electron-ray indicator or "magic eye" type of tube which exists in several commercial types, such as the type 6E5, 6N5, 6U5/6G5, etc. As more particularly shown in Figure 2, this type of tube has a display consisting of a luminous portion L and a shadow portion S, the extent of which can be varied by a change in the potential on an electrode of the tube.

In accordance with my invention, magic eye tubes E are caused to wink periodically, preferably in synchronism with the motion of the clock, e. g., once a second. All tubes may wink simultaneously or alternately. Or, only those tubes in the vicinity of the clock hands may be caused to wink, the remaining tubes presenting a steady pattern. The various circuits for performing these functions constitute other features of my invention which will now be described.

Figure 3:
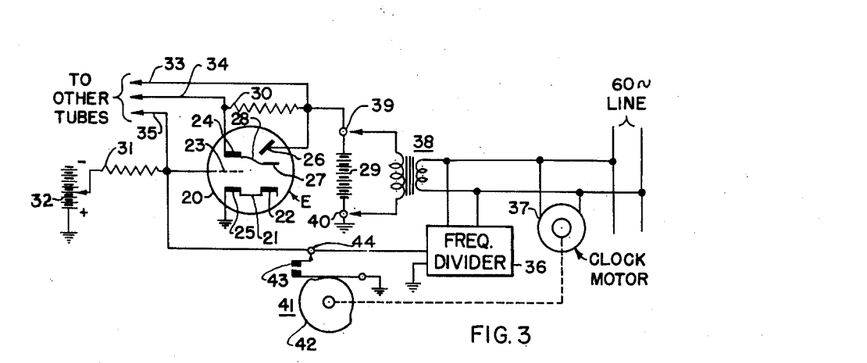
Figure 3 is a schematic diagram of a circuit which may be employed in the clock in Figure 1.
Figure 4:
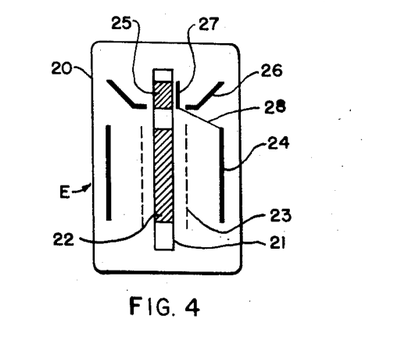
Figure 4 is a diagrammatic sketch illustrating the structure of the magic eye tube shown in Figure 3.

Reference is now made to Figure 3 which shows a novel circuit for blinking the tubes E. As is more clearly shown in Figure 4, these tubes comprise a glass envelope 20 in which is inclosed a triode section and an indicator section, both having a common cathode 21 of the indirectly heated type. The triode section includes an electron-emitting portion 22 of the cathode. Concentrically disposed about this portion of the cathode, is a helical grid 23 and a cylindrical anode 24. The indicator section includes a second electron-emitting portion 25 of the cathode, surrounded by a dish-shaped target anode 26, having a coating of fluorescent material upon the inner, frusto-conical surface thereof. Interposed between the target and one side of the cathode is a thin, vertically-disposed, shadow-control electrode 27, internally connected, as indicated by a lead 28, to the triode anode 24. Further details of the structure of this type of tube may be found in the U. S. patent of Wagner, S. N. 2,051,189, issued August 18, 1936.

By impressing a positive potential upon target 26, electrons are attracted from the cathode surface 25. On striking the target, the electrons cause the inner target surface to become fluorescent. If the potential upon the control electrode 27 is lower than the target potential, i. e., if said electrode is negative with respect to the target, a portion of the target is shielded, or "shadowed," from the electron flow, so that said portion does not fluoresce. The extent of said shadowed portion varies with variation of the potential difference between shadow control electrode 27 and the target 26. The appearance of the target is more clearly shown in Figure 2, wherein the hatched portion L is the fluorescent portion and S is the shadow portion, which is sectorially shaped.

The triode portion of the tube serves to vary the potential difference between target 26 and the shadow-control electrode 27, thus varying the extent of the shadow portion S. Referring now particularly to Figure 3, the target is connected directly to the positive terminal of a source of B-supply 29, the negative pole of which is grounded, while the triode anode is connected to said positive pole through a high resistance 30. The cathode 21 is grounded. The grid 23 is connected in series with a high resistance 31, preferably of the order of several megohms, to the negative pole of a source of grid bias 32, the positive terminal of which is grounded. The grid bias may be made adjustable as shown.

When the potential of grid 23 with respect to the cathode is zero, a heavy plate current flows from source 29 through resistance 30 and triode anode 24 to the cathode. Because resistance 30 is high, usually of the order of one megohm, the voltage drop thereacross is considerable, so that shadow control electrode 27, connected to the anode 24, is at a high negative potential with respect to target 26. As a result, control electrode 27 exercises considerable shielding effect, and a sectorial shadow, which may be as large as 90°, will be produced.

As the grid 23 is rendered increasingly negative, the potential drop in resistor 30 is progressively decreased and the shadow area likewise decreased. When grid 23 is rendered sufficiently negative to completely cut off the plate current through the triode, there is no potential drop through resistor 30. Under such conditions the potential of control electrode 27 is the same as the target 26, and the "eye" is completely closed, i. e., the shadow area is reduced to zero. Under certain conditions the two luminescent boundaries overlap to produce a sector of greater luminescence than that of the remainder of the target.

Figure 2:
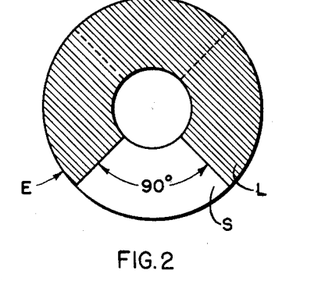
Figure 2 is a sketch illustrating the display pattern of a cathode ray tube such as used in the clock in Figure 1.

It will be evident that, by providing an additional control electrode such as 27 on the opposite side of the cathode, two oppositely extending shadow areas can be produced, as shown by the dotted lines in Figure 2. The type 6AF6G tube is one commercially available tube which has two such control electrodes. It does not, however, have any internal triode.

Although only one tube E is shown in Figure 3, all tubes constituting the clock display in Figure 1 will be connected in parallel with tube E in Figure 2, by connecting all targets to lead 33, all triode anodes to lead 34, all grids to lead 35, and all cathodes to ground.

If it is desired to have a steady display, the grid-cathode bias is adjusted to zero, whereby all the "eyes" will be open, i. e., the shadow will be maximum as shown in Figure 1. If it is desired to have all the tubes wink in synchronism, the bias on the grid 23 is made sufficiently negative to operate the triode section at cutoff, whereby shadow portions S will normally be of zero or minimum extent. Winking may be produced by impressing upon grid 23 an intermittent positive-going potential from a frequency divider 36 excited from the 60 cycle A. C. power line, to which the synchronous clock motor 37 is also connected. Divider 36 will divide the 60 cycle power frequency to a low frequency, preferably one cycle per second. The output of the frequency divider 36 will reduce the negative bias on grid 23 at a rate of one cycle per second and cause all the tubes E to wink once a second in synchronism with the motion of the clock. Thus the tubes E not only provide a striking and artistic display; they also provide an accurately timed winking once every second, which can be used for calibrating or other timing purposes.

Instead of a frequency divider, component 36 may be a separate oscillator operating at a frequency of one cycle per second, and preferably locked in synchronism with the 60 cycle current. The output of such oscillator may be any desired type of wave, e. g., sinusoidal, trapezoidal, square, sawtooth, etc., depending upon the type of display desired.

Instead of using a D. C. supply at 29, the tubes may be energized directly from the A. C. power line. For this purpose, a transformer 38 may be used with the secondary connected to terminals 39 and 40. The A. C. power line can also be used in place of the grid bias battery 32.

The circuit in Figure 3 thus far described produces the winking effect electronically and with no moving parts, and requires no connection to the clock mechanism. However, instead, of a frequency divider, a cam switch 41 driven by the clock motor may be used. The cam 41 is geared to the clock motor 37 so that it revolves once a second and closes contacts 43, connected between a terminal 44 and ground. This connects grid 23 to ground so that its potential with respect to the cathode is periodically reduced to zero and the tube E will wink. Use of the cam involves a mechanical connection to the clock mechanism, but is desirable where no source of A. C. power is available, since it can be used with self-powered clocks. If desired, both the cam switch 41 and the frequency divider 36 may be used simultaneously. The cam switch may, for instance, operate to ground the grid for five seconds and unground it for five seconds. When the contacts are closed, the voltage of grid 23 with respect to the cathode will be reduced to zero and the output of divider 36 will also be shorted out so that no winking will be produced. When the contacts 43 are open, the tubes will wink. Thus the area of fluorescence will be periodically varied by two periodic potential sources, the frequency of one potential being a subharmonic of the other and both harmonically related to a period of twelve hours, and a combined effect will be produced, which makes an even more striking display.

Figures 12, 13, 14:
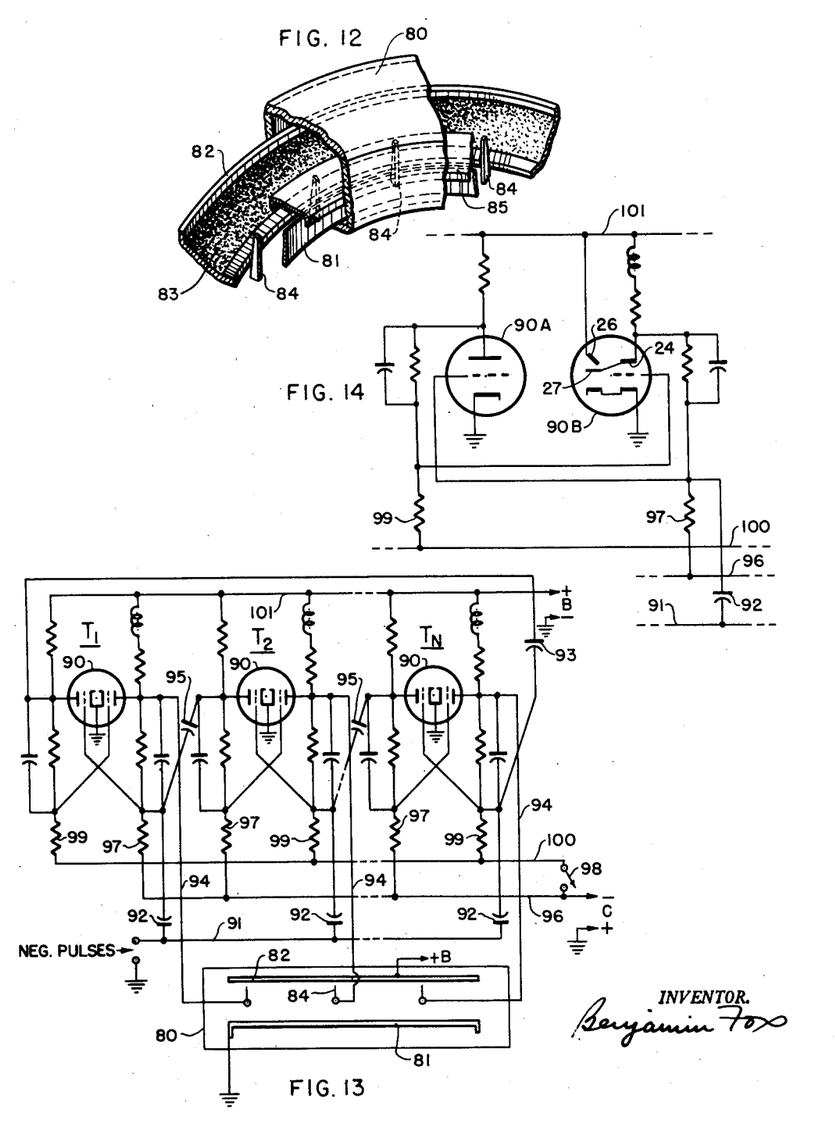
Figure 12 is a perspective view of a portion of a novel electron-ray indicator tube.
Figures 13 and 14 are schematic circuit diagrams of modifications of Fig. 10.

Instead of using a plurality of individual magic eye tubes, all tubes may be enclosed in a single ring-shaped, evacuated, glass envelope, said envelope forming the outer perimeter of the clock face. A further extension of this embodiment is illustrated in Fig. 12, which shows a portion of a ring-shaped tube with parts broken away to more clearly illustrate the structure. The numeral 80 designates a toroidally-shaped envelope which contains a single, ring-shaped, ribbon filament 81 at the inner periphery thereof, and a single frusto-conical target 82 surrounding said ribbon. Fluorescent material 83 is deposited upon the inner surface of said target. The edge of said ribbon filament is in the plane of the clock face or in a parallel plane. Between the filament and the target are twelve, rod-shaped control electrodes extending perpendicularly to the plane of the clock-face. All control electrodes may be connected together. This construction is, in effect, the equivalent of twelve magic-eye tubes in parallel. Or the control electrodes may be connected to separate controlling circuits such as those hereinafter described, particularly those in Figures 7, 8, 10 and 12. A ring-shaped, opaque shield 85 is placed over the filament to shield it from view when it is excited. Obviously such a tube can be shaped into any desired pattern.

Figure 5:
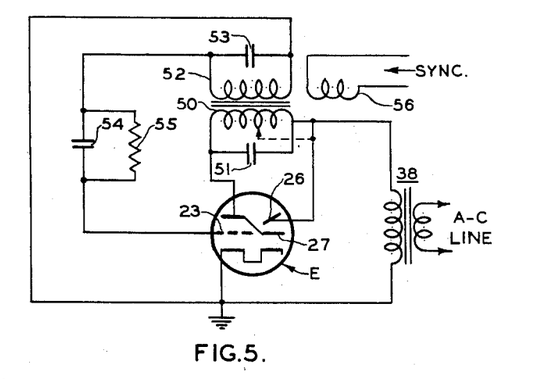
Figures 5-10 are schematic circuits for controlling the magic-eye tubes which form displays in accordance with my invention.

A modification of the circuit in Figure 3, which is also applicable to the clock arrangement in Figure 1, is shown in Figure 5, wherein the triode portion of the tube is a portion of a self-oscillating circuit, and the target 26 and the control electrode 27 are connected between points of the oscillatory circuit, whereby the periodic potential variation thereacross causes the tube to wink. The plate circuit of the tube includes the primary 50 of a transformer tuned to the desired frequency, in this case one cycle per second, by the condenser 51. To make the circuit self-oscillating, feedback is provided by the secondary 52 connected between the grid 23 and the cathode, in series with a grid condenser 54, shunted by a grid leak resistor 55. A condenser 53 may be used to tune the grid circuit to said desired frequency. Plate power is derived from a transformer 38 connected directly to the A.-C. power line, although a D.-C. power source may be used. It is desirable that transformer 38 have a low impedance to the oscillating circuit frequency, a feature that is easily provided where the sixty cycle power line is used, since a sixty cycle transformer will offer little impedance to a frequency of the order of one cycle.

Since target 26 and control electrode 27 are connected on opposite sides of coil 50, although an intermediate tap can be used as shown by the dotted line, the oscillations generated in the circuit will cause the tube to wink at the frequency of the oscillator. Obviously, any number of tubes E can be connected in parallel, as in Figure 3.

To provide more accurate timing, synchronizing oscillations can be injected into the grid circuit by means of a coil 56 coupled to coil 52. The synchronizing oscillations can be obtained from a stable oscillator or from the power line, either directly or through a suitable frequency divider, such as 36 in Figure 3. When synchronized in this manner the "magic-eye oscillator," in Figure 5 can be considered a "magic-eye frequency divider." Several such magic-eye frequency divider circuits can be connected in cascade, one divider being tuned to a subharmonic of the frequency of the preceding divider, whereby the various tubes will wink at different rates. By arranging the various tubes in various geometric patterns, striking and artistic display effects can be obtained.

Instead of tuning the transformer coils 50 and 52 to the desired winking frequency, they may be tuned to a higher frequency and the circuit adjusted to operate as a blocking oscillator which blocks itself at the desired winking rate. This can be done by reducing the time constant of R.-C. network 54—55 so that the circuit will block itself, with the rate of blocking equal to the desired winking rate. This mode of operation permits reduction of the size of the tuned circuit, yet permits winking at a frequency lower than the resonant frequency of said tuned circuit.

Figure 6:
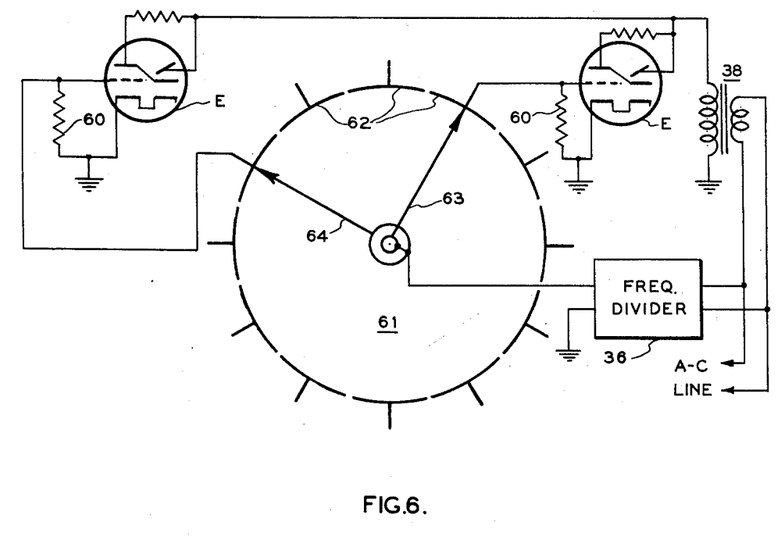

As a variation, the tubes E in Figure 1 can be connected so that only those tubes to which the hour and minute hands point will wink, the others remaining steady. A suitable circuit for doing this is shown in Figure 6, wherein only two tubes E are shown to illustrate the operation of the circuit, but it will be understood that ten more tubes will be used and connected in a similar manner. Each of tubes E have a relatively high resistance 60 connected between their grids and cathodes, whereby the grid bias is normally zero and the "eyes" are open. The one cycle per second output of a frequency divider 36, held in synchronism by the 60 cycle power line or any other stable-frequency source, is selectively applied to tubes E through a switch 61 driven by the clock motor. This switch includes twelve contacts spaced equally so as to correspond to five-minute intervals of the clock. Although a tube E is shown connected to only two of contacts 62, it will be understood that a tube will be connected to each of the contacts. The output of frequency divider 36 is connected to two contact arms 63 and 64, respectively driven in synchronism with the hour hand and minute hand of the clock. Plate power is derived from transformer 38 connected to the A.-C. line.

As the switch arms rotate, arm 63 will connect the output of frequency divider 36 across the grid circuit resistor 60 of a different tube every hour, while arm 64 will similarly connect a different tube every five minutes. At every negative swing of the divider output, the grid of the tube will be driven negative, whereby it will wink once every second.

Figure 7:
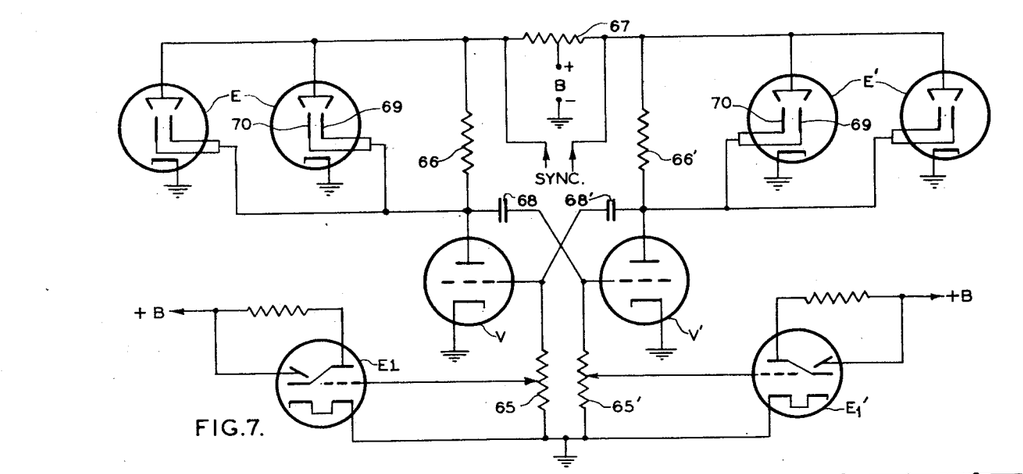

Figure 7 shows another embodiment of my invention. Triodes V and V' and their circuits function as a multivibrator. Tube V has a grid input resistor 65 and plate load resistor 66. Tube V' has similar resistors 65' and 66'. Both plate load resistors are connected to a source of B-supply through equal portions of a resistance 67, to the center tap of which the B-supply is connected. A capacitor 68 couples the plate of V to the grid of V', and a capacitor 68' couples the plate of V' to the grid of V. Thus connected, tubes V and V' operate as resistance-coupled amplifiers, with the input of one connected to the output of the other. This causes the tubes to become alternately conducting whereby square waves are generated at a frequency determined by the time constants of the resistance-capacitance circuits. Preferably, the circuit constants of both tubes are made equal, whereby the tubes will alternately conduct for equal intervals. Across resistor 67 may be connected a source of synchronizing potential, the frequency of which may be equal to or a higher harmonic of the operating frequency of the multivibrator. The synchronizing potential may be derived from the 60 cycle power line.

Across points of varying potential, such as resistors 65, 65', 66, and 66', are connected groups of magic-eye tubes E, E', E1, and E1' which will wink at a rate determined by the multivibrator frequency. As shown, tubes E and E' are "double-shadow" type 6AF6G tubes, while tubes E1 and E1' are of the single-shadow type. All tubes may be of one type, and their positions in the circuit may be interchanged.

The circuit in Figure 7 is very flexible and may be operated to give varying display effects. For instance, if it is desired to have all magic eye tubes in Figure 1 wink simultaneously, then all tubes will be connected in parallel across one resistor. If it is desired to have alternating tubes wink alternately, then the even-hour tubes may be connected in parallel across all, or a portion of, resistor 65 or 65', and every odd-hour tube connected across all, or a portion of, resistor 66 or 66'. As a variation, the clock can have two concentric rings of tubes, with the inner and outer rings winking alternately. Numerous other display effects can obviously be obtained by using all resistors to control one or more tubes in parallel and arranged in various geometric patterns.

Figure 8:
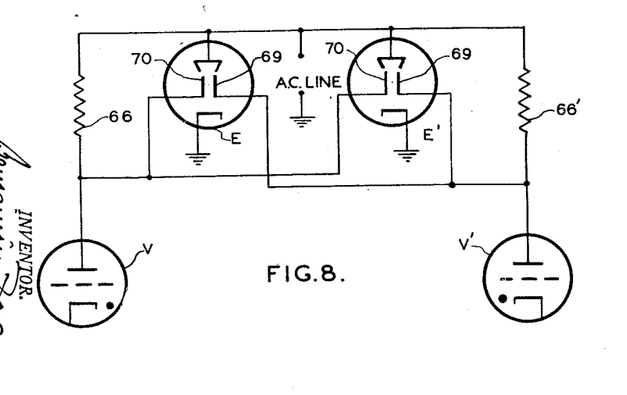

It will be noted that, in Figure 7, both electrodes 69 and 70 of all tubes E and E' are joined together. This causes both shadows in each tube to open and close simultaneously. A variation of this arrangement is shown in Figure 8, in which electrodes 69 of both tubes E and E' are connected across resistor 66', while electrodes 70 of both tubes are connected across resistor 66. This will cause the two shadows in each tube to wink alternately.

In other respects Figure 8 is the same as Figure 7, except for the following variations: In Figure 8, the B-supply is shown as the A. C. power line, although preferably it is the output of a frequency divider synchronized by the 60 cycle A. C. line. This automatically synchronizes the operation of the multivibrator tubes V and V' with the A. C. line frequency, provided that the time constants of the R.-C. circuits connected to V and V' tune the circuits to a subharmonic of the 60 cycle frequency of the power line. This mode of operation also permits tubes V and V' to be arc-discharge tubes of the Thyratron type, as indicated, since the alternating B-supply voltage permits the grids of said tubes to regain control at every cycle of said supply voltage. In order that the alternations in the B-supply voltage interfere as little as possible with the action of the multivibrator, the latter must be tuned to a very low subharmonic of the B-supply frequency; a condition which is easily met where the rate of winking is less than the persistence of vision frequency. If the above conditions are met, all the circuits described in this application may be operated with the A. C. line as a source of B-supply voltage.

When the circuit in Figure 8 is used with the clock arrangement in Figure 1, the two shadows can be aligned radially so as to form inner and outer rings of shadows, with the inner and outer rings winking in opposite phase.

Figure 9:
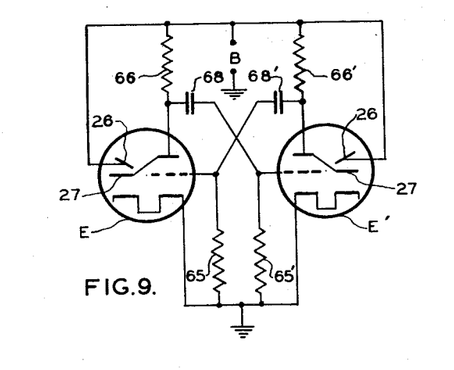

Still another modification of Figure 7 is shown in Figure 9. Here, the triode sections of tubes E and E' are interconnected to operate as a multivibrator, with the B-supply being taken from the D. C. or A. C. power line or from a frequency divider controlled thereby, as in Figure 8. The potential differences across all or a portion of plate load resistors 66 or 66' are applied between control electrodes 27 and targets 26. Each of tubes E' and E can have many similar tubes connected in parallel with it.

From what has been said in connection with Figure 5, it will be apparent that the "magic-eye multivibrator" in Figure 9 is also a "magic-eye frequency-divider" several of which can be connected in cascade, succeeding ones being tuned to a lower subharmonic of the synchronizing frequency.

Figure 10:
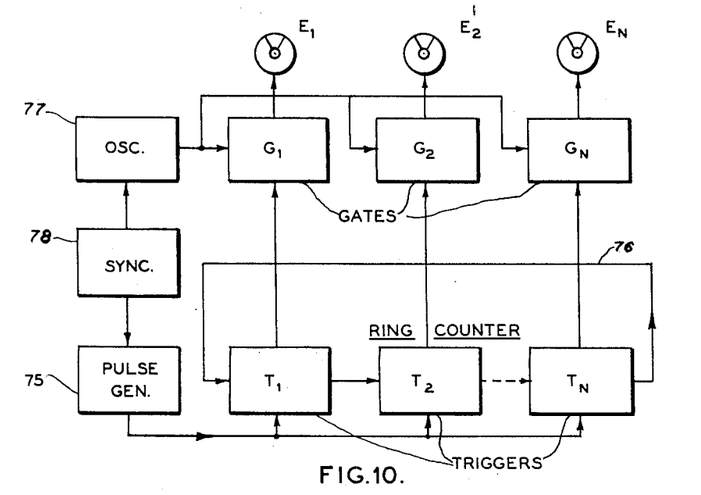

Another embodiment of my invention is shown in Figure 10. This circuit includes an N-stage electronic ring-counter, comprising of electronic trigger circuits $T_1$, $T_2$—$T_n$ of the Eccles-Jordan type, and a pulse generator 75 which supplies spaced, positive pulses to all trigger circuits. As is well known to those skilled in the art, successive pulses from generator 75, will trigger successive circuits $T_1$, $T_2$—$T_n$. Since $T_n$ is coupled to $T_1$, as indicated by connection 76, operation of $T_n$ triggers $T_1$, and the cycle of operation is repeated. As each of the triggers functions, each delivers a pulse to its output lead. The ring-counter per se is well known in the art, typical examples being disclosed in Figure 4 of Schroeder Patent 2,402,916, and in "Electronics," April 1946, pp. 150-153, and these disclosures are to be considered a part of this application.

The output leads of the ring counter are coupled to normally blocked gate circuits $G_1$, $G_2$—$G_n$. These gates are amplifiers normally biased to plate-current cutoff. The output circuits of the gates are coupled to tubes $E_1$, $E_2$—$E_n$, each of which can have several tubes connected in parallel with it. Also applied to the inputs of the gate circuits, is the output of an oscillator 77 of any desired wave form.

Preferably, generators 77 and 75 are locked in synchronism by a source of synchronizing voltage 78 which, in turn, may be controlled by the 60 cycle A. C. power line. For this purpose, generators 75 and 77 operate at different subharmonics of the frequency of synchronizing source 78, generator 77 preferably operating at a higher frequency than generator 75.

The gates $G_1$, $G_2$—$G_n$ are successively rendered conducting by the successively operating trigger sections of the ring circuit. When the gates are so rendered conducting, the output of oscillator 77 is transmitted to the tubes $E_1$, $E$—$E_n$, causing them to wink successively at a rate determined by the frequency of oscillator 77.

The circuit in Figure 10 can be used with the clock in Figure 1 instead of the circuit in Figure 6, with the additional advantage of requiring no mechanical switching. For this purpose 12 of each of components T, G and E are necessary. Then, if generator 75 delivers one pulse every five minutes, and the frequency of oscillator 77 is one cycle per second, successive triggers T operate for five-minute intervals, and successive tubes E wink once a second for each of said five-minute intervals. This is exactly the way the circuit controlled by the switch arm 64 in Figure 6 operates.

For other display effects, Figure 10 may be further modified. Instead of connecting oscillator 77 to all the gates G, each gate can be connected to an oscillator of different frequency.

Figure 10 can also be simplified by eliminating oscillator 77 and gates G, and connecting triggers T directly to tubes E. Tubes E will normally be biased to cutoff so that the "eyes" will be normally closed. Successive operation of the triggers T will successively remove the cutoff bias from tubes E and cause successive tubes to wink once at every impulse from its associated trigger circuit.

Fig. 13 illustrates in greater detail such a circuit used to control a display tube 85 which is a schematic illustration of the tube shown in Fig. 12, identical reference numerals in Figs. 12 and 13 indicating identical components. The shadow control electrodes 84 in Fig. 13, of which three are shown for purposes of illustration, are excited by a ring counter such as disclosed in "Electronics," above cited. The ring counter comprises a plurality of identical cascaded trigger circuits $T_1$, $T_2$—$T_n$ of the Eccles-Jordan type which sequentially and periodically impress positive pulses on electrodes 84 whereby the fluorescent display on successive sections of the target anode 82 is varied.

Each trigger circuit comprises a pair of triodes here shown in a single envelope 90. Because the output circuit of each triode is directly coupled to the input circuit of the other triode, the circuit has two stable states in which plate current in either triode biases the other to cutoff. The application of a negative pulse to the conducting section renders the previously blocked section conducting. These alternate conducting states are respectively designated the "on" and "off" conditions of the trigger circuit.

The trigger circuits are so arranged that only one circuit of the series is in the "on" condition at any instant. Negative trigger pulses applied simultaneously to all circuits through a lead 91 and condensers 92 pass the "on" condition consecutively to each trigger circuit, the last circuit passing this condition back to the first circuit through a coupling condenser 93. Since in the "on" condition of each circuit a positive pulse is obtained, successive operation of said circuits results in positive pulses being applied to successive controlled electrodes 84 of tube 80 through leads 94.

Each trigger circuit has two stable states, in either of which one grid is negatively biased at cutoff and the other grid is at zero potential. Since the grid of only one circuit of the series is at zero potential at any instant, the negative pulse operates only on this grid and flops this circuit to its other stable state, which is the "off" condition. During this transition, the positive rise in voltage at the plate of the left hand triode is applied through a coupling condenser 95 to the cutoff biased grid of the succeeding trigger circuit which is then turned "on." In this manner, successive positive pulses are developed at the plate of the right hand triode of each circuit and transmitted through leads 94 to the control electrodes 84 of tube 80.

Normally a negative C-bias is applied through lead 96 and resistors 97 to the left hand grids of $T_2$ and $T_n$ and to the right hand grid of $T_1$ so that the latter is "on" while the others are "off." If this condition is not initially obtained, a momentary closure of switch 98 applies a negative pulse to the opposite grids of each circuit through lead 100 and resistors 99, so that the proper sequence of operation is initiated. For further details of the structure and operation of circuits of this type, reference is made to "Electronics," above cited, and to the bibliography therein.

As a further modification, the triode sections of the magic eye tubes themselves can constitute the tubes of the trigger circuits of the ring counter. This is illustrated in Fig. 14, which shows a single trigger circuit identical to those shown in Fig. 13, with the exception of a pair of tubes 90A and 90B are substituted for the two triode sections of tube 90. Tube 90A is an ordinary triode, while the triode section of a magic-eye tube 90B functions as the other triode section of the trigger circuit. The fluorescent target 26 is connected directly to the B+ lead 101. Thus, as tube 90B becomes alternately conducting and non-conducting, the potential of plate 24 and the shadow control electrode 21 connected thereto will vary and cause a varying display on target 26.

Obviously, both tubes 90A and 90B can be of the magic-eye type and all magic-eye tubes can be in a single envelope.

It is desired to emphasize that the clock in Figure 1 is only one example of the use to which the circuits described herein can be put. Numerous other uses are possible.

Figure 11:
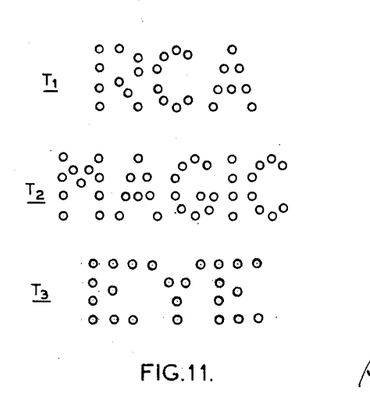
Figure 11 is a sketch illustrating an example of another type of display to which the circuits in the preceding figures are applicable.

Another example of such use is illustrated in Figure 11, which shows a display sign composed of three groups of magic eye tubes $T_1$, $T_2$, and $T_3$ arranged to spell out a sign RCA MAGIC EYE. By using the circuit in Figure 10 with a three-stage ring counter, each group of tubes can be made to wink alternately. Or if a sign has only two groups of tubes, a two-stage ring counter or the circuits in Figures 7 and 8 can be used to make each group wink alternately. Numerous other arrangements of tubes, arranged in various geometrical configurations, are possible.

A single tube such as shown in Fig. 12 can be formed into the shape of each of the letters of the sign in Fig. 11.

Thus far the circuits in Figs. 5, 7–10, and 12–14, have been discussed from the point of view of their function as means for controlling the display of magic-eye tubes. From another point of view, these circuits may also be used for the usual purposes for which multivibrators, oscillators, frequency dividers, trigger circuits and counter circuits are used. Thus, conventional trigger circuits such as shown in Figs. 7–10, 13, and 14 are commonly used for switching purposes. The "on" or "off" condition of such circuits are usually indicated by an auxiliary means, e. g., a neon tube, which is often unsatisfactory. In the present circuits, the magic-eye tubes inherently function to give such indication. Cascaded trigger circuits such as shown in Figs. 13 and 14 are commonly used in decade counters and computers to totalize a number of pulses. The neon tube indicators usually used in such circuits are often critical as to operating conditions, such as voltages applied to the electrodes, temperature, age, etc., and hence may cause faulty counts to be indicated. By the use of such circuits as herein shown in Figs. 13 and 14, the magic-eye tubes act as indicators of the operativeness of the circuit and at the same time provide a counting or computing function.

Although the invention has been described with particular reference to the use of the magic-eye type of tube, it is to be understood that the invention is equally applicable to other types of tubes having variable luminous displays. The magic eye type of tube has been chosen for illustration merely because at present it is the simplest and most easily available type of tube suitable for the purpose.

Subject matter disclosed but not specifically claimed herein, is being claimed in a division of this application, Serial No. 194,697, filed November 8, 1950.

While there have been described what are at present considered preferred embodiments of the invention, it will be obvious to those skilled in the art that various changes and modifications may be made therein without departing from the invention; and it is aimed in the appended claims to cover all such changes and modifications as fall within the true spirit and scope of the invention.

I claim:

1. An electric clock having at least a pair of time-indicating pointers and a synchronous driving motor for moving said pointers, a luminous display including a plurality of electron-excited fluorescent areas symmetrically arranged about the face of said clock and acting as time-indicating indicia for said pointers, periodic means for varying the excitation of said fluorescent areas, and means for synchronizing said motor and said periodic means.

2. The combination set forth in claim 1, wherein said last named means includes a common source of alternating current for exciting said motor and controlling said periodic means.

3. The combination set forth in claim 1, wherein said fluorescent areas are electrodes of magic-eye tubes.

4. The combination set forth in claim 1, wherein said fluorescent areas are disposed upon the anode electrodes of a plurality of electron tubes each having cathode and control electrodes, and wherein said periodic means is a self-oscillating circuit including said electrodes.

5. In a luminescent display, a cathode ray tube comprising a cathode, a control electrode, an anode, and a fluorescent element adapted to be excited by electrons from said cathode, an alternating space-current source connected between said anode and cathode, a periodic potential source coupled between said cathode and control electrode to periodically vary the excitation of said fluorescent element, the frequency of said space-current source being greater than the persistence frequency of the human eye, and the frequency of said periodic potential being less than said persistence frequency.

6. In a display device as set forth in claim 5, wherein the frequency of said space-current source is 60 cycles per second and the frequency of said periodic potential is one cycle per second.

7. In a display device as set forth in claim 5, wherein said space-current source is the 60 cycle alternating current mains, and wherein said periodic potential is locked in synchronism with said alternating current.

8. An electronic display system comprising a plurality of electron tubes arranged to form a desired pattern, each tube comprising a cathode, a fluorescent target, and means for directing electrons from said cathode to said target, means connecting each target to the alternating-current mains, each of said tubes having control means to vary the flow of electrons to said targets, and a source of periodic potential having a frequency less than the persistence frequency of the human eye coupled to said control means to produce periodic variations in the fluorescence of said targets at a visible rate.

9. A clock comprising hour and minute hands, a plurality of electron tubes each comprising a cathode, a fluorescent target, and means for directing electrons from said cathode to said target, the targets being symmetrically spaced around the face of said clock and acting as time indicating indicia for said hands, an alternating space-current source for said tubes, each of said tubes having control means to vary the flow of electrons to said targets, and a source of periodic potential coupled to said control means to produce periodic variations in the fluorescence of said targets at a visible rate, the frequency of said potential being less than the frequency of said space-current source.

10. A clock comprising hour and minute hands, a plurality of electron tubes each comprising a cathode, a fluorescent target, and means for directing electrons from said cathode to said target, the targets being symmetrically spaced around the face of said clock and acting as time indicating indicia for said hands, each of said tubes having control means to vary the flow of electrons to said targets, and means to apply a periodic potential to said control means to produce periodic variations in the fluorescence of said targets at a visible rate.

11. A clock comprising hour and minute hands, twelve electron tubes each comprising a cathode, a fluorescent target, and means for directing electrons from said cathode to said target, the targets being symmetrically spaced around the face of said clock and acting as time indicating indicia for said hands, each of said tubes having control means to vary the flow of electrons to said targets, means normally biasing said control means to render only a portion of the area of said targets fluorescent, and a plurality of periodic potential sources coupled to said control means to produce periodic variations in the amount of fluorescent area on said targets at a visible rate, one of said potentials having a frequency which is a subharmonic of the frequency of the other, and both frequencies being harmonically related to a period of twelve hours.

12. A clock comprising hour and minute hands, twelve electron tubes each comprising a cathode, a fluorescent target, and means for directing electrons from said cathode to said target, the targets being symmetrically spaced around the face of said clock and acting as time indicating indicia for said pointers, each of said tubes having a pair of diametrically-opposed control electrodes between the cathode and target to vary the flow of electrons to said targets, and a periodic potential source coupled in opposite phase to said respective control electrodes to produce periodic variations in the fluorescence of said targets at a visible rate.

13. A clock comprising an electron tube having at least a cathode, a fluorescent target upon which electrons from said cathode are directed to cause at least a portion of said target to become fluorescent, and electron-flow control means to determine the extent of the portion of said target which becomes fluorescent, and a plurality of alternating-current potential sources coupled to said control means, the frequency of one of said potentials being a multiple of the frequency of the other, and both frequencies being harmonically related to a period of twelve hours.

14. A clock comprising hour and minute hands, twelve electron tubes each comprising a cathode, a fluorescent target, and means for directing electrons from said cathode to said target, the targets being symmetrically spaced around the face of said clock and acting as time indicating indicia for said hands, each of said tubes having control means to vary the flow of electrons to said targets, means normally biasing said control means to render the entire area of said targets fluorescent, and at least a pair of periodic potential sources coupled to said control means to produce periodic variations in the amount of fluorescent area on said targets at a visible rate, one of said potentials having a frequency which is a subharmonic of the frequency of the other, and both frequencies being harmonically related to a period of twelve hours.

15. A clock comprising hour and minute hands, twelve electron tubes each comprising a cathode, a fluorescent target, and means for directing electrons from said cathode to said target, the targets being symmetrically spaced around the face of said clock and acting as time indicating indicia for said hands, means connecting each target to the alternating-current mains, each of said tubes having control means to vary the flow of electrons to said targets, and a plurality of periodic potential sources coupled to said control means to produce periodic variations in the fluorescence of said targets at a visible rate, one of said potentials having a frequency which is a subharmonic of the frequency of the other, and both frequencies being harmonically related to a period of twelve hours.

BENJAMIN FOX.

REFERENCES CITED

The following references are of record in the file of this patent:

UNITED STATES PATENTS

| Number | Name | Date |
|---|---|---|
| 1,124,215 | Dempsey | Jan. 5, 1915 |
| 1,289,371 | Blades | Dec. 31, 1918 |
| 1,769,060 | Hendry | July 1, 1930 |
| 1,813,759 | Peters | July 7, 1931 |
| 2,041,115 | Clayton | May 19, 1936 |
| 2,089,131 | Moreton | Aug. 3, 1937 |
| 2,175,690 | Happe | Oct. 10, 1939 |
| 2,251,504 | Steiber | Aug. 5, 1941 |
| 2,304,813 | Gibbs | Dec. 15, 1942 |
| 2,410,156 | Flory | Oct. 29, 1946 |

OTHER REFERENCES

Electrical Counting, MacMillan Co., 1943, pages 86, 87, and 91.